United States Patent [19]

Chen et al.

[11] Patent Number: 4,840,929
[45] Date of Patent: Jun. 20, 1989

[54] ZEOLITE BETA WITH IMPROVED REGENERATION CHARACTERISTICS

[75] Inventors: Nai Y. Chen, Titusville, N.J.; Sharon B. McCullen, Newtown, Pa.

[73] Assignee: Mobil Oil Corporation, New York, N.Y.

[21] Appl. No.: 218,438

[22] Filed: Jul. 11, 1988

Related U.S. Application Data

[63] Continuation of Ser. No. 70,607, Jul. 2, 1987, abandoned, which is a continuation of Ser. No. 835,690, Mar. 3, 1986, abandoned.

[51] Int. Cl.$^4$ ............................................. B01J 29/32
[52] U.S. Cl. ........................................ 502/74; 502/66
[58] Field of Search .................................. 502/66, 74

[56] References Cited

U.S. PATENT DOCUMENTS

| | | | |
|---|---|---|---|
| 2,916,440 | 12/1959 | Hogin et al. | 208/140 |
| 3,140,322 | 7/1964 | Frilette et al. | 260/667 |
| 3,201,355 | 8/1965 | Kimberlin, Jr. et al. | 252/411 |
| 3,226,339 | 12/1965 | Frilette et al. | 252/455 |
| 3,243,384 | 3/1966 | Raarup, Jr. | 252/415 |
| 3,308,069 | 3/1967 | Wadlinger et al. | 208/111 |
| 3,442,795 | 5/1969 | Kerr et al. | 208/120 |
| 3,462,377 | 8/1969 | Plank et al. | 252/455 |
| 3,496,246 | 2/1970 | Chen | 260/677 |
| 3,591,488 | 7/1971 | Eberly, Jr. et al. | 208/111 |
| 3,640,681 | 2/1972 | Pickert | 23/111 |
| 3,654,182 | 4/1972 | Hayes | 252/415 |
| 3,691,099 | 9/1971 | Young | 252/450 |
| 3,856,872 | 12/1974 | Morrison | 260/668 |
| 3,937,791 | 2/1976 | Garwood et al. | 423/328 |
| 3,986,982 | 10/1976 | Crowson et al. | 252/415 |
| 4,093,560 | 6/1978 | Kerr et al. | 252/455 Z |
| 4,188,282 | 2/1980 | Tabak et al. | 208/134 |
| 4,312,790 | 1/1982 | Butter et al. | 252/455 Z |
| 4,359,400 | 11/1982 | Landolt et al. | 252/415 |
| 4,377,468 | 3/1983 | La Pierre et al. | 502/74 |
| 4,377,495 | 3/1983 | Tse | 252/415 |
| 4,568,655 | 2/1986 | Oleck et al. | 502/66 |

FOREIGN PATENT DOCUMENTS 1061047 3/1967 United Kingdom .
1189850 4/1970 United Kingdom .

*Primary Examiner*—Carl F. Dees
*Attorney, Agent, or Firm*—Alexander J. McKillop; Charles J. Speciale; Malcolm D. Keen

[57] ABSTRACT

The present invention describes a method for preparing a noble metal Zeolite Beta containing catalyst with improved platinum redispersion characteristics. The method includes using a mineral acid to extract the framework aluminum from the zeolite and forming the catalyst particles without the use of inorganic oxide binders.

8 Claims, No Drawings

ZEOLITE BETA WITH IMPROVED REGENERATION CHARACTERISTICS

This is a continuation of copending application Ser. No. 070,607, filed on July 2, 1987, now abandoned.

CROSS REFERENCE TO RELATED APPLICATIONS

U.S. patent application Ser. No. 647,594, filed Sept. 6, 1984 (abandoned), is directed to the preparation of highly dispersed noble metal-containing catalysts.

U.S. patent application Ser. No. 379,399, filed May 18, 1983 (abandoned), is directed to an acid dealuminized high silica Zeolite Beta.

U.S. patent application Ser. No. 656,297, filed Oct. 1, 1984 (abandoned), is directed to a process for regenerating noble metal-containing zeolite catalysts.

U. S. patent application Ser. No. 580,925, filed Feb. 16. 1984 (abandoned), is directed to a method for regenerating noble metal-containing highly siliceous zeolite hydrocarbon conversion catalysts.

U.S. patent application Ser. No. 740,690, filed June 3, 1985 (abandoned) now U.S. Pat. 4,615,997, is directed to the preparation of noble metal-containing zeolite catalysts.

U.S. patent application Ser. No. 835,828, filed Mar. 3, 1986 (abandoned), is directed to a noble metal-containing Zeolite Beta with improved stability.

BACKGROUND OF THE INVENTION

1. Field of the Invention

The present invention is directed to a process for preparing a crystalline silicate zeolite, and more particularly to a process for preparing a binder-free Zeolite Beta containing at least one highly dispersed noble metal. The present invention is specifically directed to a binder-free noble metal-containing Zeolite Beta crystalline silicate which has superior redispersion properties after having become deactivated.

2. Discussion of Prior Art

Shape-selective catalysis utilizing molecular sieves was first demonstrated by P. B. Weisz and V. J. Frilette in *J. Phys. Chem.*, 64, page 302 (1960). Since then, the shape-selective catalytic properties of various zeolites have been extensively demonstrated. For example, N. Y. Chen and W. E. Garwood, in "Some Catalytic Properties of ZSM-5, a New Shape Selective Zeolite", *Journal of Catalysis*, 52, pages 453–458 (1978), described the shape-selectivity of ZSM-5. On the other hand, the use of zeolites as shape-selective supports for catalytic functions has received much less attention.

P. B. Weisz, V. J. Frilette, R. W. Maatman and F. B. Mower, in "Catalysis by Crystalline Aluminosilicates II. Molecular-Shape Reactions", *Journal of Catalysis*, 1, pages 307–312 (1962), described a shape-selective olefin hydrogenation catalyst comprising platinum incorporated in zeolite A. In U.S. Pat. No. 3,140,322 to V. J. Frilette and P. B. Weisz, a process is disclosed for hydrogenation using a platinum-containing zeolite. In U.S. Pat. No. 3,226,339 of V. J. Frilette and R. W. Maatman, a process is described for the preparation of a platinum- or palladium-containing zeolite catalyst. U.S. Pat. No. 3,575,045 to J. N. Miale discloses the use of platinum-entrained zeolite A for selective hydrogenation.

A catalyst and process for selectively hydrogenating ethylene in the presence of propylene utilizing a zeolite in conjunction with a hydrogenation metal is disclosed in U.S. Pat. No. 3,496,246. N. Y. Chen and P. B. Weisz, in "Molecular Engineering of Shape-Selective Catalysts", *Kinetics and Catalysis, Chem. Eng. Prog. Symp.*, Ser. No. 73, Vol. 63, 1967, page 86, describes a platinum-catalyzed hydrogenation process employing a phosphine-poisoned, platinum-exchanged sodium mordenite zeolite.

An excellent summary of the art of metal-loaded zeolite catalysts and shape-selective catalysis is given in *Zeolite Chemistry and Catalysts*, J. A. Rabo, Ed., ACS Monograph 1 (1976). Of particular interest is Chapter 10, "Catalytic Properties of Metal-Containing Zeolites" by K. M. Minachev and Y. I. Isakov, and Chapter 12, "Shape-Selective Catalysis" by S. M. Csicsery.

Catalysts, such as ZSM-5 combined with a Group VIII metal, are described in U.S. Pat. No. 3,856,872 to Morrison. It is disclosed in this patent that the catalysts are preferably incorporated in a porous matrix, such as alumina. A Group VIII (hydrogenation) metal may then be added after incorporation with the zeolite in a matrix by such means as base-exchange or impregnation. In one embodiment, the metal is added in the form of chloroplatinic acid.

U.S. Pat. No. 4,188,282 discloses particularly preferred forms of noble metal-containing zeolites, such as ZSM-5, formed by the crystallization of the zeolite from a forming solution containing noble metal ions, such as those of platinum. U.S. Pat. No. 3,462,377 to Plank et al discloses the preparation of metal-containing zeolite catalysts in which the activity of the catalyst is enhanced by steaming.

British Pat. No. 1,189,850 discloses the preparation of a noble metal-containing zeolite catalyst, in which a metal-loaded ammonium zeolite, which has been manufactured by contacting zeolite material with ammonia and/or ammonium ions and which has been composited with one or more hydrogenation metals, is subjected to controlled oxidative calcination.

U.S. Pat. No. 4,312,790 to Butter et al discloses a method of preparing a noble metal-containing catalyst by incorporating a noble metal in a cationic form with a zeolite after crystallization of said zeolite, but prior to the final catalyst particle formation. The zeolite is calcined only after extrusion, i.e., after addition of the noble metal. Such catalysts have been found to be an improvement over those catalysts wherein the metal is incorporated during zeolite crystallization, or after extrusion. The catalyst thus produced also exhibits little hydrogenation-dehydrogenation activity.

The deactivation of noble metal-containing hydrocarbon conversion catalysts due to the deposition on the catalyst of carbonaceous residues is a well-known phenomenon which has received much attention in the technical and patent literature. The problem with regard to catalyst deactivation is particularly acute with respect to supported noble metal-containing catalysts employed in the reforming of naphtha feedstocks. Undesired metal migration and agglomeration can occur during preparation, calcination or oxidative regeneration of such catalysts, resulting in significant losses in catalyst properties, such as hydrogenation activity.

Numerous methods have been suggested by prior workers for the regeneration or rejuvenation of supported noble metal catalysts which have been deactivated. Regeneration can be defined as the process of removing carbonaceous materials from a catalyst generally by burning the catalyst in an oxygen atmosphere. Regeneration is most useful in those cases where the requirement on a noble metal bound to the catalyst is not severe, i.e., processes involving the catalytic processing of relatively clean hydrocarbon feedstocks. In those processes utilizing heavy crudes where the requirements on the catalyst are more severe, the deactivated catalyst must be rejuvenated. Rejuvenation is the process of ridding the catalyst of everything foreign to it and returning the catalyst to its original state. Rejuvenation also involves redispersing the metal that is on the catalyst. Rejuvenation generally requires a halogen step to redisperse to noble metal on the catalyst.

In U.S. Pat. Nos. 2,916,440; 3,243,384; 3,201,355; and 3,654,182, there are disclosed procedures utilizing gaseous mixtures containing oxygen and a halogen or halogen compound, particularly hydrogen chloride, for dissipating carbonaceous residue. In U.S. Pat. No. 3,378,419, there is disclosed a procedure for the rejuvenation of supported platinum catalysts involving (a) addition of halogen to the catalyst while in contact with the process feedstock, and (b) burning the coke deposits from the catalyst with an oxygen-containing, halogen-free regeneration gas.

It is also known in the art to rejuvenate platinum group metal-containing zeolite catalysts. Rejuvenation of noble metal-loaded zeolite catalysts requires certain procedural modifications because the metal must be returned in a dispersed form within the zeolite pores. U.S. Pat. No. 3,986,982 to Crowson et al treats deactivated platinum group metal-loaded zeolites by contacting them with a stream of an inert gas containing from 0.5 to 20 vol % of free oxygen and from 5 to 500 ppm volume of chlorine as $Cl_2$, HCl, or an organic chlorine-containing material. The resulting catalyst is purged to remove residual oxygen and chlorine and then reduced in a stream of hydrogen at 200° to 600° C.

U.S. Pat. No. 4,359,400 to Landolt et al teaches a method of rejuvenating deactivated supported multimetallic platinum-containing hydrocarbon conversion catalysts in the absence of oxygen or oxygen sources. The catalysts are contacted with an oxygen-containing gas at elevated temperatures followed by contact with a dry oxygen-free, hydrogen halide. The catalyst is then activated in the presence of chlorine gas and in the absence of oxygen or oxygen sources, such as water, followed by reduction with hydrogen. The catalysts, rejuvenatable by Landolt et al's method, may contain support materials comprising an aluminosilicate zeolite, such as naturally occurring or synthetic erionite, mordenite or faujasite.

U.S. Pat. No. 4,377,495 to Tse discloses rejuvenating sulfur-deactivated catalysts by contacting them with a hydrogen-rich gas, water, and a mixture of liquid chlorinated hydrocarbon and an oxygenated hydrocarbon, prior to coke burnoff.

Attempts have been made to increase the silica:alumina mole ratio of crystalline zeolites by removal of aluminum from the crystal structure with strong acids. The silica:alumina mole ratio of zeolites may also be increased by converting the parent zeolite at least partially to its hydrogen form, hydrolyzing the aluminum to aluminum hydroxide, and thereafter physically removing the displaced aluminum.

U.S. Pat. No. 3,442,795 discloses a process for preparing highly siliceous zeolite-type materials from crystalline aluminosilicates by means of a solvolysis, e.g., hydrolysis, followed by a chelation. In this process, the acid form of a zeolite is subjected to hydrolysis, to remove aluminum from the aluminosilicate. The aluminum can then be physically separated from the aluminosilicate by the use of complexing or chelating agents, such as ethylenediaminetetraacetic acid or carboxylic acid, to form aluminum complexes which are readily removable from the aluminosilicate. Ultra-high silicon-content zeolites and their preparation by the use of acid and complexing agents are disclosed in U.S. Pat. No. 4,093, 560. The method described in this patent is, however, applicable only to zeolites with a silica:alumina ratio of 2:1 to 6:1.

In U.S. Pat. No. 3,937,791, a method is described for removing alumina from a crystalline aluminosilicate. This method comprises heating the aluminosilicate to a temperature in the range between about 50° and 100° C., in the presence of a cationic form of chromium, in an aqueous solution of above 0.01N of a chromium salt of a mineral acid at a pH less than 3.5, so that the atomic ratio of chromium to aluminum is greater than 0.5.

A method for increasing the silica-to-alumina mole ratio of a crystalline aluminosilicate zeolite by contacting the zeolite with water at elevated temperature, and then treating to remove alumina from the crystal lattice, is disclosed in U.S. Pat. No. 3,591,488. Following the high temperature water treatment, amorphous alumina is removed from the zeolite material by contacting with a dilute mineral acid or an organic acid chelating agent.

In U.S. Pat. No. 3,640,681, framework aluminum is extracted from crystalline zeolites using acetylacetone as the extracting agent. Prior to contact with the acetylacetone, the zeolite must be rendered substantially cation-deficient and at least partially dehydroxylated. Other metals can be substituted for the extracted framework aluminum by contacting the zeolite with a metal acetylacetone.

The treatment of zeolites with gaseous chlorine compounds, such as $Cl_2$ or HCl, to remove aluminum $AlCl_3$, is described in DE-OS No. 2,510,740.

British Pat. No. 1,061,047 describes a method of removing alumina from certain zeolites, including stilbite and zeolites L and T, by treatment with mineral or organic acids. The zeolites which may be heated in this way have an initial silica:alumina ratio of at least 5:1. This technique was found, however, to be inapplicable with many zeolites, such as ZSM-5, especially those with higher silica:alumina ratios. In addition, certain zeolites, such as zeolites X and Y, lose an unacceptable large degree of crystallinity when treated with acid, although this may be mitigated by presence of a salt anion which is capable of combining with the aluminum, as reported in U.S. Pat. No. 3,691,099.

However, the prior art does not disclose an economical and efficient method of preparing a crystalline silicate Zeolite Beta of improved platinum redispersion characteristics.

OBJECTS OF THE INVENTION

Accordingly, it is an object of the present invention to produce a crystalline silicate Zeolite Beta of improved stability.

It is another object of the present invention to prepare a noble metal crystalline silicate Zeolite Beta which exhibits improved platinum redispersion efficiency and improved catalyst rejuvenation properties.

It is still another object of the present invention to produce a noble metal crystalline silicate Zeolite Beta which is particularly useful in low pressure hydroisomerization processes.

These and other objects are fulfilled by the present invention, which is disclosed below.

SUMMARY OF THE INVENTION

The present invention is directed to a process for preparing a binder-free Zeolite Beta containing at least one highly dispersed noble metal, comprising removing the framework aluminum from the Zeolite Beta by acid dealuminization to form a silica-to-alumina ratio greater than about 100; and incorporating the noble metal onto the Zeolite Beta.

DESCRIPTION OF PREFERRED EMBODIMENTS

The present invention is directed to a process for preparing a catalyst containing a noble metal-containing crystalline silicate Zeolite Beta. The catalyst exhibits improved noble metal redispersion characteristics and rejuvenability properties. The method is generally directed to removing the framework aluminum from the Zeolite Beta by a mineral acid and by forming the catalyst particles without the use of inorganic oxide binders. The catalyst exhibits improved dewaxing and isomerizing performance and platinum redispersion efficiency.

The catalyst prepared according to the present invention shows unexpected enhancements in the dewaxing of real feeds, noble metal stability in oxidizing atmospheres and the efficiency of noble metal redispersion. An acid dealuminized Zeolite Beta may be rejuvenated more easily than a steamed-dealuminized Zeolite Beta. Therefore, if a feedstock is relatively heavy, i.e., high concentration of heteroatoms, and requires relatively severe conditions to be processed, then processing the feedstock over a zeolite will generally result in a severely deactivated zeolite over a period of time. However, because an acid dealuminized zeolite has good noble metal redispersion properties, by rejuvenating the zeolite, generally with chlorine treatment, the original zeolite activity will return.

Zeolite Beta

The present invention provides a catalyst having excellent hydroisomerization activity. It is believed that the close relationship between zeolite acidity and the metal sites causes the catalyst to function as an excellent isomerization catalyst.

Zeolite Beta is a crystalline zeolite having a pore size greater than 5 Angstroms. Its composition and X-ray structure are described in U.S. Pat. Nos. 3,308,069 and Re. 28,341, to which reference is made for a description of this zeolite, its preparation and properties.

Zeolite Beta is unique in that it is both a useful low pressure hydrocracking catalyst and it has the ability to hydroisomerize and dewax. As a hydrocracking catalyst, it is known to upgrade heavy fuel oils and waxy gas oils to premium distillate fuels and lube products. As a hydroisomerization catalyst, it reduces the pour point of the waxy normal (n−) paraffins to nonwaxy isoparaffins having the same molecular weight. This method of dewaxing is very different than that of, for example, zeolite ZSM-5, in which the waxy n-paraffins are removed by cracking to naphtha and light gas.

The hydrocracking and hydroisomerization and/or dewaxing processes are capable of occurring at the same time, depending upon the feed composition and the reaction conditions selected. For example, hydroisomerization activity is favored at low pressures, i.e., 400 psig or lower, while higher pressures generally result in hydrocracking. Whether or not one or the other, or both, reactions have occurred may be readily determined by analyzing the products and comparing them with the feed. For example, in bulk conversions of high aromatic heavy gas oil to naphtha suitable for reforming to high octane gasoline, hydrocracking has occurred. If n-paraffins are converted to isoparaffins, hydroisomerization has occurred. In fact, dewaxing may occur by isomerization of n-paraffins to isoparaffins, as well as by paraffin cracking.

The Zeolite Beta crystal of this invention is combined with a hydrogenation-dehydrogenation component. The hydrogenation-dehydrogenation component is provided by a metal or combination of metals. Noble metals which are incorporated within the zeolite by the present invention include a metal or metals of Groups IB, IIB, VA, VIA or VIIIA of the Periodic Table (IUPAC and U.S. National Bureau of Standards approved Table, as shown, for example, in the Chart of the Fisher Scientific Company, Catalog No. 5-702-10). The preferred hydrogenation components are the noble metals of Group VIIIA, especially platinum, but other noble metals, such as palladium, osmium, ruthenium or rhodium may also be used. Combinations of noble metals, such as platinum-palladium, may also be used.

If the metal to be impregnated into or exchanged onto the Zeolite Beta is platinum, it may be done, for example, by treating the Zeolite Beta with a platinum metal-containing ion. Suitable platinum compounds include platinum tetraamine nitrate. and various compounds containing the platinum amine complex. The metal complex may be either cationic or anionic. Both types of compounds can be used. Platinum compounds, in which the metal is in the form of a cation complex, e.g., $Pt(NH_3)_4Cl_2$, are particularly useful, as are anionic complexes such as the vanadate and metatungstate ions. Cationic forms of other metals are also very useful, since they may be exchanged onto the zeolite or impregnated into it.

When it is used in the present catalysts, Zeolite Beta is at least partly in the hydrogen form in order to provide the desired acidic functionality for the reactions which are to take place. It is normally preferred to use Zeolite Beta in a form which has sufficient acidic functionality to give it an alpha value of 1 or more. The alpha value, a measure of zeolite acidic functionality, is described, together with details of its measurement, in U.S. Pat. No. 4,016,218 and in *J. Catalysis,* Vol. VI, pages 278–287 (1966), and reference is made to these for such details.

It has been found that steamed Zeolite Beta catalysts having an alpha value of from 100 to 200, preferably about 150, are preferred for the process, as compared to unsteamed catalysts having alpha value equal to about 600 to 800.

Because the hydrogenation functionality may also be varied by choice of metal and its relative quantity, the balance between the hydrogenation and cracking functions may be adjusted as circumstances require. The ammonia produced in the first stage will, to some degree, tend to reduce the acidic functionality of the hydrocracking catalyst; but, in the present process, only a limited degree of conversion is desired and so the reduced cracking consequent upon the diminution of acidic functionality is not only acceptable, but also useful.

The preferred forms of Zeolite Beta for use in the present process are the high silica forms, having a silica: alumina ratio of at least 100:1 to 1500:1, preferably 100:1 to 500:1. It has been found that Zeolite Beta may be prepared with silica:alumina ratios above the 200:1 maximum specified in U.S. Pat. Nos. 3,308,069 and Re. 28,341. The preparation of the highly siliceous forms of Zeolite Beta is disclosed in U.S. Pat. No. 4,419,220, to which reference is made for a description of these forms and their preparation.

The silica:alumina ratios referred to in this specification are the structural or framework ratios, that is, the ratio of the $SiO_4$ to the $AlO_4$ tetrahedra, which together constitute the structure of which the zeolite is composed. This ratio may vary from the silica:alumina ratio determined by various physical and chemical methods. For example, a gross chemical analysis may include aluminum which is present in the form of cations associated with the acidic sites on the zeolite, thereby giving a low silica:alumina ratio. Similarly, if the ratio is determined by the thermogravimetric analysis (TGA) or ammonia desorption, a low ammonia titration may be obtained of cationic aluminum prevents exchange of the ammonium ions onto the acidic sites. These disparities are particularly troublesome when certain treatments, such as the dealuminization method described below, which result in the presence of ionic aluminum free of the zeolite structure, are employed. Due care should therefore be taken to ensure that the framework silica:alumina ratio is correctly determined.

It is critical to the success of the present invention that the Zeolite Beta treated by the process of the present invention be binder-free. That is, the Zeolite Beta does not contain inorganic binders, such as alumina, silica, silica-alumina, magnesia, titania, zirconia and thoria.

Preparation Procedures

Preparation of the catalyst of the present invention involves a number of steps. They are briefly summarized as follows:

(1) preparing the Zeolite Beta by known procedures;

(2) removing framework aluminum from the Zeolite Beta with acid;

(3) incorporating the noble metal onto Zeolite Beta; and (4) calcining the Zeolite Beta in a stream of oxygen.

Zeolite Beta is prepared according to conventional procedures known to the art. For example, reference is made to U.S. Pat. Nos. 3,308,069 and Re. 28,341 for a description of the preparation of Zeolite Beta. It is important to the success of the present invention that the Zeolite Beta be prepared in a binder-free manner. This will become more apparent in the examples.

The Zeolite Beta is generally purged in an inert gas stream, such as nitrogen or helium, with nitrogen being preferred, at a temperature of about 1000° F. (538° C.) at atmospheric pressure for approximately two hours. This step decomposes the organics which are present from the Zeolite Beta synthesis. The Zeolite Beta is next calcined in an oxygen environment, such as air, for approximately two hours at a temperature of about 1000° F. (538° C.). This step removes any carbonaceous residues that the aforementioned step did not remove.

The Zeolite Beta should have a silica-to-alumina ratio in the range of 100 to 1500, preferably 100 to 500. The silica-to-alumina ratio of the zeolite may be determined by the nature of the starting materials used in its preparation and their quantities relative one to another. Some variation in the ratio may therefore be obtained by changing the relative concentration of the silica precursor relative to the alumina precursor, but definite limits in the maximum obtainable silica-to-alumina ratio of the zeolite may be observed. For Zeolite Beta, this limit is usually about 100:1 (although higher ratios may be obtained), and for ratios above this value, other methods are usually necessary for preparing the desired high silica zeolite. One such method comprises dealuminization by extraction with acid, and this method is disclosed in detail in U.S. patent application Ser. No. 379,399, filed May 18, 1983 by R. B. LaPierre and S. S. Wong, entitled "High Silica Zeolite Beta", and reference is made to this application for additional details of the method.

Briefly, the method comprises contacting the zeolite with an acid, preferably a mineral acid such as hydrochloric acid. The dealuminization proceeds readily at ambient and mildly elevated temperatures and occurs with minimal losses in crystallinity to form high silica forms of Zeolite Beta with silica-to-alumina ratios of at least 100:1, with ratios of 200:1 or even higher being readily attainable.

The zeolite is conveniently used in the hydrogen form for the dealuminization process, although other cationic forms may also be employed, for example, the sodium form. If these other forms are used, sufficient acid should be employed to allow for the replacement by protons to the original cations in the zeolite. The amount of zeolite in the zeolite/acid mixture should generally be from 5 to 60 wt %.

The acid may be a mineral acid, i.e., an inorganic acid or an organic acid. Typical inorganic acids which can be employed include mineral acids, such as hydrochloric, sulfuric, nitric and phosphoric acids, peroxydisulfonic acid, dithionic acid, sulfamic acid, peroxymonosulfuric acid, aminodisulfonic acid, nitrosulfonic acid, chlorosulfuric acid, pyrosulfuric acid, and nitrous acid. Representative organic acids which may be used include formic acid, trichloracetic acid, and trifluoracetic acid.

The concentration of added acid should be such as not to lower the pH of the reaction mixture to an undesirably low level, which could affect the crystallinity of the zeolite undergoing treatment. The acidity which the zeolite can tolerate will depend, at least in part, upon the silica-to-alumina ratio of the starting material. Generally, it has been found that Zeolite Beta can withstand concentrated acid without undue loss in crystallinity, usually 1 to 2N. These values hold good regardless of the silica-to-alumina ratio of the Zeolite Beta starting material. Stronger acids tend to effect a relatively greater degree of aluminum removal than weaker acids.

The dealuminization reaction proceeds readily at ambient temperatures, but mildly elevated temperatures may be employed, e.g., up to boiling. The duration of the extraction will affect the silica-to-alumina ratio of the product, since extraction, being diffusion controlled, is time dependent. However, because the zeolite becomes progressively more resistant to loss of crystallinity as the silica-to-alumina ratio increases, i.e., it becomes more stable as the aluminum is removed, higher temperatures and more concentrated acids may be used towards the end of the treatment than at the beginning without the attendant risk of losing crystallinity.

After the extraction treatment, the product is water-washed free of impurities, preferably with distilled water, until the effluent wash water has a pH within the approximate range of 5 to 8.

After the proper effective silica-to-alumina mole ratio has been attained, the noble metal is then incorporated onto the Zeolite Beta. The noble metal component is generally physically, intimately admixed with the zeolite in the form of either cationic or anionic noble metal species, or their salts. In the case of the preferred metal, platinum, suitable cationic compounds include platinum tetraamine nitrate and various compounds containing platinum amine or amine complexes. The noble metal may be added to the Zeolite Beta to the extent that the resulting Zeolite Beta contains about 0.01 to 10 wt %, preferably 0.1 to 3 wt %, noble metal.

After noble metal loading, the zeolite is calcined by exposure to temperatures ranging from about 482° to 662° F. (250°–350° C.) in order to decompose the platinum complex and to avoid high concentrations of moisture at high temperatures. Calcining may take place in an atmosphere containing $O_2$ in concentrations ranging from about 10 to 50% for a period of time from 2 to 10 hours. The preferred calcination step is as follows. After ammonium-exchanging, the Zeolite Beta is air-dried at room temperature for approximately 4 hours. Then, it is heated in dry air at temperatures rising incrementally at a programmed rate of 1° C. per minute to 130° C., where it is maintained for approximately 2 hours. By "programmed rate", it is meant that the incrementally raised temperatures may be monitored manually or by computer. This process removes the majority of the water in Zeolite Beta. After approximately 2 hours, the Zeolite Beta is again incrementally heated at a programmed rate of 1° C. per minute until the temperature reaches 350° C. This step decomposes the platinum complex to platinum oxide. It is not advisable to heat at temperatures higher than 350° C.

The slow incremental programming rate is important. It allows the water to evaporate at low temperatures. If the catalyst is introduced to water at high temperatures, the platinum dispersion would be low and, thus, the Zeolite Beta would be less regenerable. Therefore, the water removal step and the platinum amine composition step should be carefully regulated.

The calcined zeolite may then be reduced with a suitable reducing agent, such as hydrogen or hydrogen-containing gas, in order to convert the noble metal into its elemental form. This step is not narrowly critical and is well known in the prior art. The preferred reduction agent is hydrogen, and temperatures usually employed range from about 260° to 538° C. (500°–1000° F.) for periods of time ranging from 1 to 24 hours. The pressure of hydrogen is not narrowly critical, but usually ranges from about 1 to 70 atm.

The prepared binder-free platinum-Zeolite Beta may then be extruded or pelleted according to procedures known to the art. It should be noted, however, that if the Zeolite Beta crystalline silicate is to be extruded, this step should occur prior to the steaming step. Extrusion necessarily involves mixture with water, which would have to be removed. Pelleting, on the other hand, is a water-free process which can be done either at the beginning of the process or at the end.

The process of the present invention provides a binder-free zeolite catalyst containing a highly dispersed noble metal, with a dispersion of at least 0.6, and preferably at least 0.8. The dispersion index has been calculated by a hydrogen chemisorption method known to the art. This technique indicates the extent of noble metal agglomeration of a catalyst material. The dispersion index is a numerical range extending from 0 to 1. A dispersion index of 0 indicates a highly agglomerated state, while a dispersion index of 1 indicates a highly dispersed state. For example, a platinum-containing catalyst having a dispersion index of 0.6 means that out of 100 atoms of platinum, 60 atoms are accessible to hydrogen. Reference is made to *Structure of Metallic Catalysts*, J. R. Anderson, Ch. 6, p. 295, Academic Press (1975), for details of this analytical method.

EXAMPLES

In the following examples, the redispersion of platinum on acid and steam dealuminized Zeolite Beta described.

EXAMPLE 1

Five grams of binder-free platinum/acid extracted Zeolite Beta were heated to 851° F. (455° C.), 100 psi, in a 3.5% oxygen-helium gas mixture, which contained 20 torr of water for 16 hours to simulate a commercial oxygen regeneration process. The sample had a platinum dispersion of 0.25 following regeneration. The sample was reduced at 842° F. (450° C.), followed by redispersion treatment with chlorine, water and oxygen in an inert gas at 842° F. (450° C.) for 4 hours. Gas partial pressures are listed in Table 1 below. After chlorine treatment, the catalyst was reduced in hydrogen at 842° F. (450° C.). The redispersion treatment had increased the platinum dispersion to 0.65.

EXAMPLE 2

This experiment was performed in the same manner as Example 1 above, with the exception that platinum/-steamed Zeolite Beta was used. The platinum dispersion decreased from 0.6 to 0.3.

EXAMPLE 3

In this experiment, platinum/acid extracted Zeolite Beta/$SiO_2$ catalyst, with a platinum dispersion of 0.1, was treated for redispersion as described in Example 1, but without oxygen or water. As illustrated in Table 1 below, no change in platinum dispersion was observed.

TABLE 1

| Catalyst | Example 1 Pt/Acid Extracted Beta | Example 2 Pt/Steamed Beta | Example 3 Pt/Acid Extracted Beta/$SiO_2$ |
|---|---|---|---|
| Initial Dispersion | 0.25 | 0.60 | 0.10 |
| Final Dispersion | 0.65 | 0.30 | 0.10 |
| $P_{Cl_2}$, torr | 4 | 4 | 10 |
| $P_{O_2}$, torr | 325 | 325 | — |
| $P_{H_2O}$, torr | 50 | 50 | — |
| Temperature, °C. | 450 | 450 | 450 |
| Total Pressure | 1 atm | 1 atm | 1 atm |

The rejuvenation of a noble metal zeolite catalyst is an important property of a useful catalyst. By the present invention, it has been found that the combination of a binder-free Zeolite Beta in which the silica-to-alumina ratio was increased by acid dealuminization results in a catalyst of improved rejuvenation characteristics.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A process for preparing a binder-free high silica/alumina ratio Zeolite Beta containing at least one highly dispersed noble metal, comprising:
   (a) removing framework alumina from said Zeolite Beta in the absence of a binder by treatment with acid to produce a Zeolite Beta having a silica-to-alumina mole ratio greater than about 100;
   (b) incorporating said noble metal into the product of step (a); and
   (c) calcining the product of step (b) in oxygen.

2. The process according to claim 1, wherein the silica-to-alumina mole ratio of said Zeolite Beta produced in step (a) is between 100 and 1500.

3. The process according to claim 1, wherein the silica-to-alumina mole ratio of said Zeolite Beta produced in step (a) is between 100 and 500.

4. The process according to claim 1, wherein said noble metal is platinum.

5. The process according to claim 4, wherein said Zeolite Beta contains about 0.1 to 3 wt % platinum.

6. The process according to claim 1, wherein said acid is a mineral acid.

7. A process for preparing a highly dispersed platinum-containing binder-free Zeolite Beta having a silica-to-alumina mole ratio between 100 and 500, said process comprising:
   (a) contacting an as-synthesized Zeolite Beta with an inert gas at a temperature of about 1000° F. at about atmospheric pressure for approximately two hours;
   (b) calcining the product of step (a) in an oxygen environment at a temperature of about 1000° F. for approximately two hours;
   (c) removing the framework alumina from said Zeolite Beta in the absence of a binder by treatment with acid to the required silica-to-alumina mole ratio;
   (d) incorporating said platinum onto the product of step (c);
   (e) ammonium-exchanging the product of step (d); and
   (f) calcining the product of step (e).

8. The process according to claim 7, wherein the calcination step of step (f) comprises:
   (a) air-drying the product of step 7(e);
   (b) heating said product of step (a) at programmed increments of 1° C. per minute to 130° C.;
   (c) maintaining said 130° C. temperature for approximately two hours; and
   (d) heating the product of step (c) at programmed increments of 1° C. per minute to 350° C.

* * * * *